US010641338B2

(12) United States Patent
Kuwabara et al.

(10) Patent No.: US 10,641,338 B2
(45) Date of Patent: May 5, 2020

(54) BEARING STRUCTURE FOR SHAFT

(71) Applicant: HONDA MOTOR CO., LTD., Minato-ku, Tokyo (JP)

(72) Inventors: Naoki Kuwabara, Wako (JP); Masayuki Fujita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/757,697

(22) PCT Filed: Sep. 30, 2015

(86) PCT No.: PCT/JP2015/077743
§ 371 (c)(1),
(2) Date: Mar. 6, 2018

(87) PCT Pub. No.: WO2017/056234
PCT Pub. Date: Apr. 6, 2017

(65) Prior Publication Data
US 2019/0040911 A1 Feb. 7, 2019

(51) Int. Cl.
*F16C 35/06* (2006.01)
*B62K 21/06* (2006.01)
(Continued)

(52) U.S. Cl.
CPC .............. *F16C 35/06* (2013.01); *B62K 21/06* (2013.01); *F16B 39/24* (2013.01); *F16C 19/166* (2013.01);
(Continued)

(58) Field of Classification Search
CPC ......... B62K 19/32; B62K 21/06; F16B 39/24; F16C 2226/60; F16C 35/06; F16C 35/067;
(Continued)

(56) References Cited

U.S. PATENT DOCUMENTS 3,942,570 A * 3/1976 Bochman, Jr. .......... F16B 39/10
411/220
3,986,750 A * 10/1976 Trent ........................ B60T 8/72
301/35.63
(Continued)

FOREIGN PATENT DOCUMENTS

CN 1903595 1/2007
CN 101835673 9/2010
(Continued)

OTHER PUBLICATIONS

Machine Translation of JP-2002098127-A (Year: 2002).*
(Continued)

*Primary Examiner* — Alan B Waits
(74) *Attorney, Agent, or Firm* — Amin, Turocy & Watson, LLP (57) ABSTRACT

A bearing structure for a shaft includes a shaft on which a male thread section is formed and a concave section recessed inside in a radial direction is partially formed in a circumferential direction thereof, a cylindrical holder in which the shaft is disposed, a bearing attached between the shaft and the holder and configured to rotatably support the shaft at an opening side thereof at which the holder is open, a thread engagement member having a female thread section threadedly engaged with the male thread section and a flat surface section crossing the circumferential direction of the shaft and formed on an outer circumference thereof, and coaxially threadedly fastened to the shaft from the opening side, and a locking member having a convex section fitted into the concave section and an engaging section engaged with the flat surface section, and partially locked to the shaft and the thread engagement member.

5 Claims, 4 Drawing Sheets

(51) Int. Cl.
*F16C 33/78* (2006.01)
*F16B 39/24* (2006.01)
*F16C 19/16* (2006.01)
*F16C 25/06* (2006.01)

(52) U.S. Cl.
CPC .......... *F16C 25/06* (2013.01); *F16C 33/7889* (2013.01); *F16C 2326/26* (2013.01)

(58) Field of Classification Search
CPC ...... F16C 35/07; F16C 35/073; F16C 19/166; F16C 25/06; F16C 33/7889
See application file for complete search history.

(56) References Cited

U.S. PATENT DOCUMENTS

| | | | | |
|---|---|---|---|---|
| 4,573,698 A | * | 3/1986 | Takahashi | B62K 21/06 180/219 |
| 4,593,924 A | * | 6/1986 | Cabeza | B62K 19/32 280/279 |
| 4,812,094 A | * | 3/1989 | Grube | F16B 39/10 411/134 |
| 5,147,144 A | * | 9/1992 | Kasai | F16C 35/063 403/259 |
| 5,221,168 A | * | 6/1993 | Kasai | F16C 35/063 411/124 |

| | | | | |
|---|---|---|---|---|
| 2007/0024106 A1 | | 2/2007 | Urabe | |
| 2014/0021695 A1 | | 1/2014 | Watanabe et al. | |
| 2015/0000106 A1 | * | 1/2015 | Ebert | B60B 27/0078 29/525.11 |

FOREIGN PATENT DOCUMENTS

| | | | |
|---|---|---|---|
| CN | 102458176 | | 5/2012 |
| CN | 104213621 | | 12/2014 |
| JP | 2-125205 | | 10/1990 |
| JP | 09-011962 | | 1/1997 |
| JP | 10-324108 | | 12/1998 |
| JP | 2002098127 A | * | 4/2002 .............. F16C 25/06 |
| JP | 2009-006994 | | 1/2009 |
| JP | 2011-201468 | | 10/2011 |
| JP | 2012-166677 | | 9/2012 |
| JP | 2014-19240 | | 2/2014 |
| JP | 2014-058189 | | 4/2014 |

OTHER PUBLICATIONS

International Search Report for PCT/JP2015/077743 dated Dec. 22, 2015, 4 pgs.
Written Opinion for PCT/JP2015/077743 dated Dec. 22, 2015, 4 pgs.
Chinese Office Action for Chinese Patent Application No. 201580083360.5 dated Apr. 30, 2019.
Japanese Office Action for Japanese Patent Application No. 2017-542595 dated Feb. 19, 2019.

* cited by examiner

BEARING STRUCTURE FOR SHAFT

TECHNICAL FIELD

The present invention relates to a bearing structure for a shaft.

BACKGROUND ART

Conventionally, a bearing structure for a shaft is disclosed in, for example, Patent Document 1. In a bearing structure for a steering shaft including a steering shaft, a head pipe in which the steering shaft is inserted, and a bearing assembled between the steering shaft and the head pipe from an upper end side of the head pipe in a state in which an upper end portion of the steering shaft protrudes upward from an upper end of the head pipe, and configured to rotatably support the steering shaft, a double nut is threadedly coaxially fastened to the steering shaft from the upper end side of the head pipe to fasten and fix the bearing.

RELATED ART DOCUMENT

Patent Document

Patent Document 1: Japanese Unexamined Patent Application, First Publication No. H09-11962

SUMMARY

Problems to be Solved by the Invention

However, in the case of Patent Document 1, since two lock nuts should be threadedly fastened to the steering shaft to perform retaining of the bearing, much effort is required for assembly work of the lock nuts and assembly workability is decreased when the retaining of the bearing is performed.

An aspect of the present invention is to provide a bearing structure for a shaft capable of improving assembly workability when retaining of a bearing is performed.

Means for Solving the Problem

An aspect of the present invention is a bearing structure for a shaft including a shaft on which a male thread section is formed and a concave section recessed inside in a radial direction is partially formed in a circumferential direction thereof, a cylindrical holder in which the shaft is disposed, a bearing attached between the shaft and the holder and configured to rotatably support the shaft at an opening side thereof at which the holder is open, a thread engagement member having a female thread section threadedly engaged with the male thread section and a flat surface section crossing the circumferential direction of the shaft and formed on an outer circumference thereof, and coaxially threadedly fastened to the shaft from the opening side, and a locking member having a convex section fitted into the concave section and an engaging section engaged with the flat surface section, and partially locked to the shaft and the thread engagement member.

In the aspect of the present invention, the convex section and the engaging section are constituted by a continuous member.

In the aspect of the present invention, the shaft is disposed on front forks configured to support an axle of a front wheel of a saddle riding vehicle, the holder is supported by a vehicle body frame such that a longitudinal direction is along an upward/downward direction, and the bearing rotatably supports the shaft in a state in which a first end portion of the shaft in an axial direction protrudes upward from an upper end of the holder.

In the aspect of the present invention, a dust cover configured to suppress adhesion of dust to the first end portion is installed above the locking member, and a fixing unit configured to fix a steering mechanism is installed on the first end portion above the dust cover.

In the aspect of the present invention, the plurality of flat surface sections are disposed to be arranged in the circumferential direction of the shaft using the shaft as a symmetrical axis, and the engaging section is disposed between the two flat surface sections neighboring in the circumferential direction of the shaft.

In the aspect of the present invention, when seen in an axial direction of the shaft, the plurality of flat surface sections are disposed rotationally symmetrically, and at least one of the convex section and the engaging section is disposed rotationally symmetrically in plural.

Advantage of the Invention

According to the aspect of the present invention, it is possible to improve assembly workability when retaining of a bearing is performed.

DESCRIPTION OF THE EMBODIMENTS

Hereinafter, embodiments of the present invention will be described on the basis of the accompanying drawings. Further, directions of forward, rearward, leftward, rightward, and the like described below are the same as directions in a vehicle described below unless the context clearly indicates otherwise. In addition, an arrow FR showing a forward direction with respect to a vehicle, an arrow LH showing a leftward direction with respect to the vehicle, and an arrow UP showing an upward direction with respect to the vehicle are provided at appropriate places used in the following description.

<Entire Vehicle>

Figure 1:
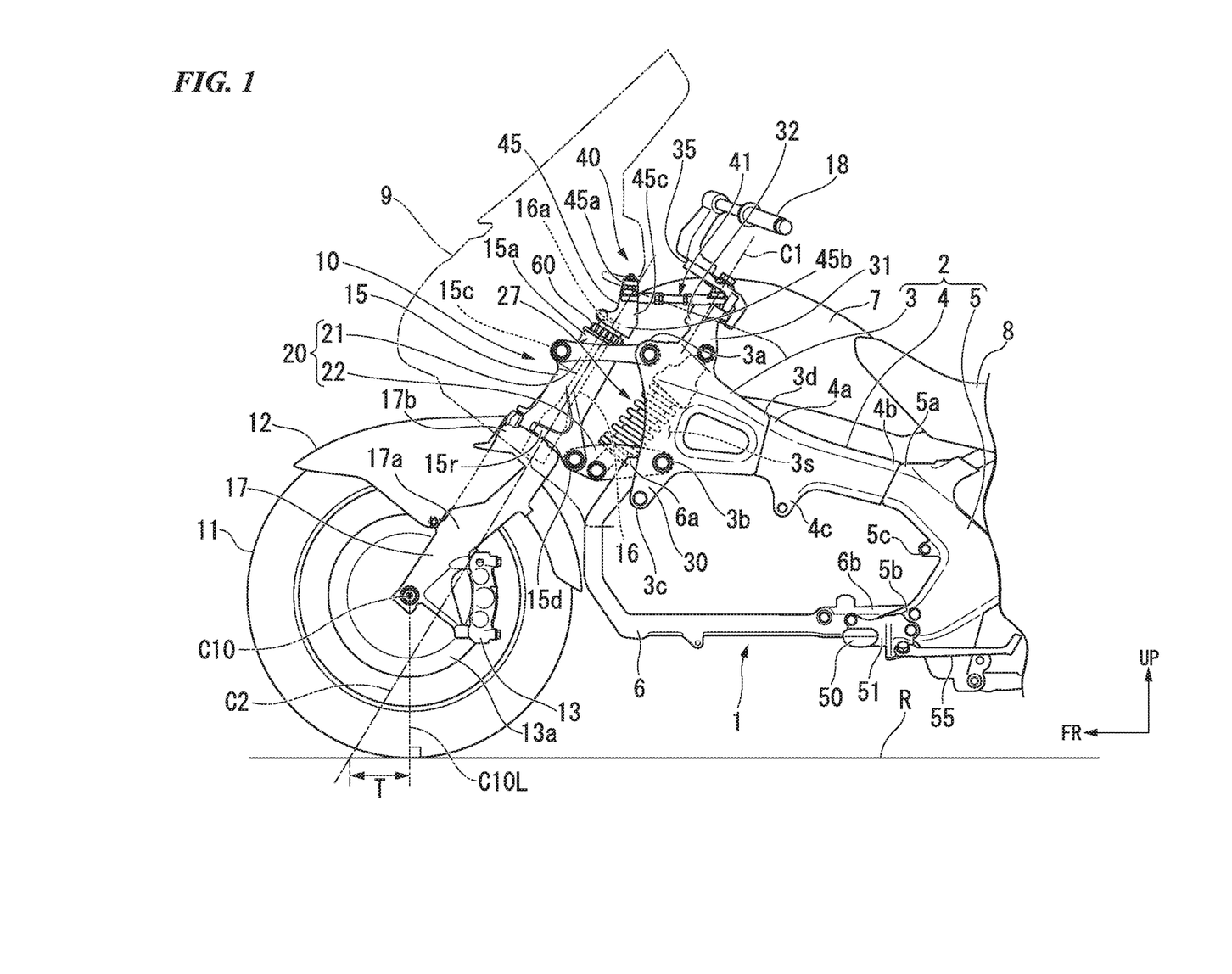
FIG. 1 is a left side view of a vehicle body front section of a motorcycle according to an embodiment.

FIG. 1 shows a vehicle body front section of a motorcycle, which is an example of a saddle riding vehicle. Referring to FIG. 1, a vehicle body frame 1 of the motorcycle has a front block 3 configured to support a front wheel suspension system 10 on a front end portion thereof, and includes a pair of left and right main frames 2 extending forward and rearward from the vehicle.

The left and right main frames 2 integrally have the front block 3 having a shape with a forward/rearward width that is increased as it goes forward, a pivot section 5 formed in a V shape having a forward/rearward width that is widened as it goes forward and opening forward, and configured to support a rear wheel suspension system (not shown), and a connecting section 4 extending to be gently inclined to be disposed downward as it goes rearward from a rear end 3d of the front block 3 and bridging the rear end 3d of the front block 3 and a front upper end 5a of the pivot section 5 when seen in a side view. A vertical width of a front end 4a of the connecting section 4 is substantially the same as a vertical width of the rear end 3d of the front block 3, and a vertical width of a rear end 4b of the connecting section 4 is substantially the same as a vertical width of the front upper end 5a of the pivot section 5.

The vehicle body frame 1 further includes a pair of left and right lower frames 6 that form a J shape when seen in a side view. The lower frames 6 extend from a front lower end portion 5b of the pivot section 5 disposed behind the main frames 2 to extend forward below the vehicle and upward before the vehicle, and reach a front lower end portion of the front block 3.

For example, an engine (not shown) is mounted in a space surrounded by the main frames 2 and the lower frames 6. A fuel tank 7 is disposed above the front block 3 and the connecting section 4. A seat 8 is disposed above the pivot section 5. A vehicle body front section of the motorcycle is covered with a front cowl 9 formed of a synthetic resin.

While not shown, the front block 3 forms a gate type (an inverted V shape) having a lateral width that narrows as it goes upward and opening downward when seen in a front view. A lower opening section of the gate type shape in the front block 3 is designated by reference character 3s.

The upper connecting section 3a to which a rear end portion of an upper arm 21 is connected is formed on a front upper end portion of the front block 3. A handle support section 31 configured to support a bar handle 18 (a handle) is formed behind a front upper section and the upper connecting section 3a of the front block 3 to extend rearward and upward. An extension section 30 extending forward and downward is formed on a front lower section of the front block 3.

A lower connecting section 3b to which a rear end portion of a lower arm 22 is connected is formed on the extension section 30, and a front upper section 6a of the lower frames 6 is connected to the extension section 30. A lower support section 3c on which left and right side portions of a front upper section of the engine are supported is formed on a lower end portion of the extension section 30. Left and right side portions of central upper sections before and behind the engine are supported by a support section 4c of the connecting section 4, and left and right side portions of the rear section of the engine are supported by a support section 5c of the pivot section 5. The lower frames 6 may support the engine.

Reference character 50 in FIG. 1 designates a step, reference character 51 designates a step support member configured to support the step 50, and reference character 55 designates a side stand.

<Front Wheel Suspension System>

The front wheel suspension system 10 includes front forks 17 configured to support a front wheel 11 at lower end portions thereof, a handle post 35 (a steering section) pivotably supported by the handle support section 31 and pivoted about a first steered axis C1 according to an operation of the bar handle 18, a fork holder 15 (a holder) configured to pivotably support the front forks 17 around a second steered axis C2, a link mechanism 41 and a steered member 45 connected between the handle post 35 and the fork holder 15, a support arm 20 extending in a forward/rearward direction of the vehicle and having upper lower arms 21 and 22 configured to vertically swingably support the front wheel 11, and a cushion member 27 expanded and contracted according to movement of the front wheel 11 to obtain a shock absorbing action. Pivotal movement around the first steered axis C1 and steered movement of the front wheel 11 according to an operation of the bar handle 18 are linked via the handle post 35, the link mechanism 41, the steered member 45, the fork holder 15 and the front forks 17. The bar handle 18, the handle post 35, the link mechanism 41 and the steered member 45 constitute a steering mechanism 40.

The first steered axis C1 is a pivot axis of the handle post 35 pivoted according to an operation of the bar handle 18, and coincides with a central axis of a cylindrical boss section 32 in the handle support section 31. The second steered axis C2 is a pivot axis of the front forks 17 pivoted according to an operation of the bar handle 18, and coincides with a central axis of the fork holder 15 that forms a cylindrical shape. An angle of the second steered axis C2 with respect to a vertical direction is a "caster angle." The second steered axis C2 is offset (separated) forward from the first steered axis C1 when seen in a side view. The second steered axis C2 and the first steered axis C1 are substantially parallel to each other.

<Front Forks>

The front forks 17 integrally have a shaft section 16 (a shaft) that forms the second steered axis C2, a pair of left and right arm sections 17a extending upward and downward, and a cross member 17b configured to connect upper end portions of the left and right arm sections 17a. The left and right arm sections 17a are disposed at both of left and right sides of the front wheel 11. The cross member 17b is curved inward along a tread surface of an upper end position of the front wheel 11 in a vehicle width direction, and is disposed between the upper end portions of the left and right arm sections 17a. Left and right end portions of the cross member 17b are connected to the upper end portions of the left and right arm sections 17a. Elements of the front forks 17 are, for example, integrated aluminum parts, and the elements are integrally welded and coupled to each other.

The shaft sections 16 of the front forks 17 are pivotably supported around the second steered axis C2 by the fork holder 15 inward in a radial direction of the fork holder 15 that forms a cylindrical shape. Upper end portions 16a (first end portions) of the shaft sections 16 of the front forks 17 are connected to the steered member 45.

An axle of the front wheel 11 (hereinafter, referred to as a "front wheel axle") is connected to lower end portions of the left and right arm sections 17a. For example, both end portions of the front wheel axle in the vehicle width direction are fixed to the lower end portions of the left and right arm sections 17a via ball bearings (not shown). A wheel of the front wheel 11 is pivotably supported by a center of the front wheel axle in the vehicle width direction. A front fender 12 (see FIG. 1) is supported by the cross member 17b via a bolt (not shown).

Reference character 13 in FIG. 1 designates a brake caliper. Reference character 13a designates a brake rotor. Reference character C10 designates a central axis of the front wheel axle. Reference character C10L shows a vertical line falling from the central axis C10 to a road surface R. Reference character T designates a trail.

<Fork Holder>

The fork holder 15 is installed in front of the first steered axis C1 to be separated therefrom. Specifically, the fork holder 15 forms a cylindrical shape and is installed to be inclined rearward in the vertical direction in front of the front block 3. The fork holder 15 supports the shaft section 16 of the front forks 17 inward in the radial direction pivotably (to be steered) around the steered axis C2. The upper end portion 16a of the shaft section 16 protrudes upward from an upper end portion 15a of the fork holder 15. The shaft section 16 and the fork holder 15 use the second steered axis C2 as a central axis thereof.

An upper connecting section 15c to which a front end portion of the upper arm 21 is connected is formed to protrude forward and upward from a front upper section of the fork holder 15. A lower connecting section 15d to which a front end portion of the lower arm 22 is connected is formed to protrude rearward and downward from a rear lower section of the fork holder 15. The upper connecting section 15c is disposed in front of the second steered axis C2 when seen in a side view, and the lower connecting section 15d is disposed behind the second steered axis C2 when seen in a side view. Ribs 15r configured to reinforce the lower connecting section 15d are formed at left and right side surfaces of the fork holder 15. The ribs 15r have a V shape opening forward and upward when seen in a side view, and extend to be branched forward and upward from the lower connecting section 15d such that a rib height is increased as it approaches the lower connecting section 15d.

<Steered Member>

The steered member 45 is supported by the upper end portion 16a of the shaft section 16 above the upper end portion 15a of the fork holder 15. The steered member 45 integrally has a link front connecting section 45a to which a front end portion of the link mechanism 41 is connected, a shaft support section 45b formed in a C shape opening forward when seen in a direction along the second steered axis C2, and a connecting section 45c configured to connect the link front connecting section 45a and the shaft support section 45b. The link front connecting section 45a, the shaft support section 45b and the connecting section 45c are, for example, integrally formed aluminum parts.

An insertion hole opening in the vehicle width direction is formed in a front end portion of the shaft support section 45b. For example, in a state in which the shaft support section 45b is inserted into the upper end portion 16a of the shaft section 16, as a bolt is threadedly fastened to a nut through the insertion hole, the steered member 45 is fastened and fixed to the upper end portion 16a of the shaft section 16. The steered member 45 is integrally pivotable (steerable) around the second steered axis C2 with the front forks 17 according to an operation of the bar handle 18.

<Bearing Structure for Shaft>

Figure 3:
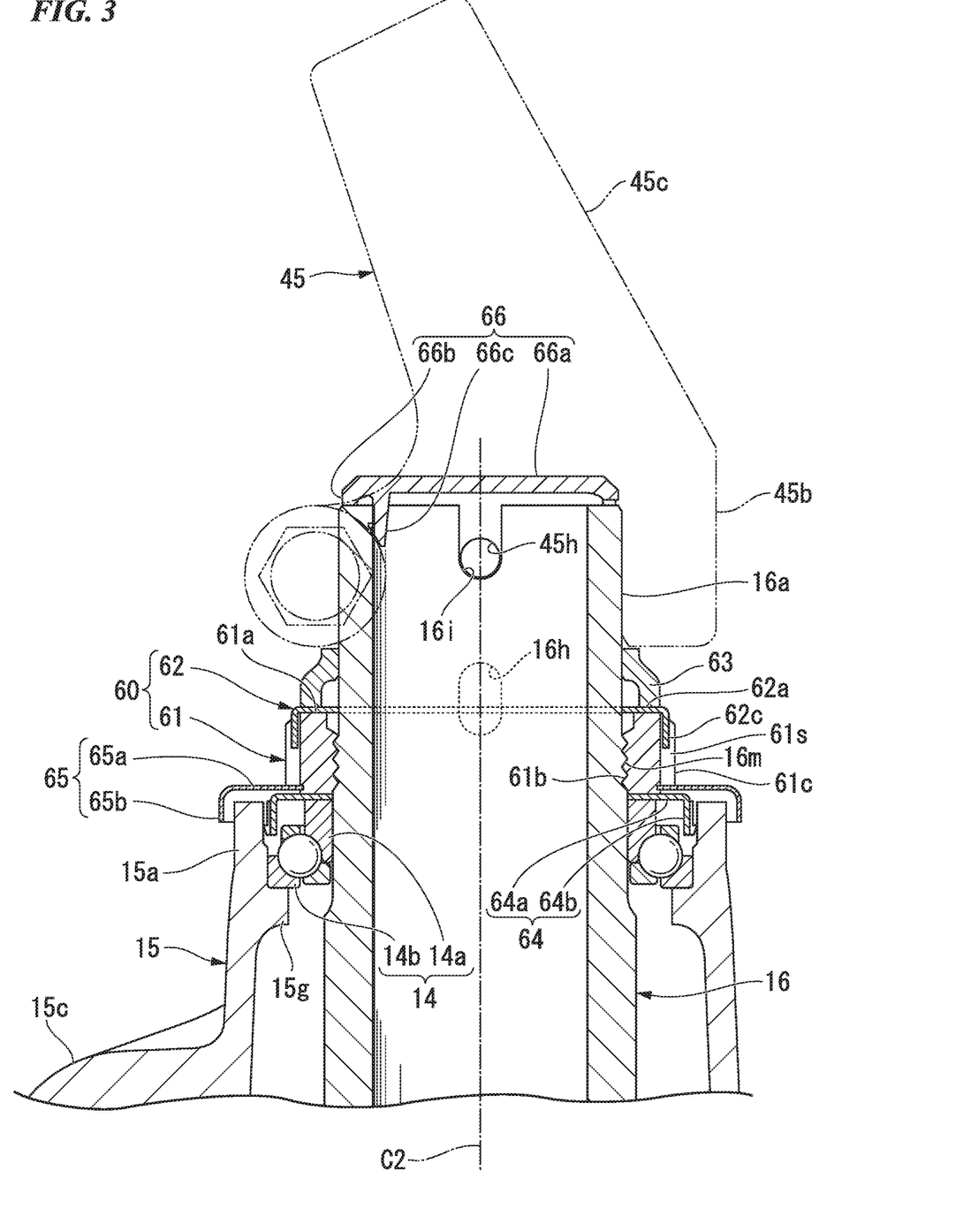
FIG. 3 is a cross-sectional view taken along line in FIG. 2.
Figure 4:
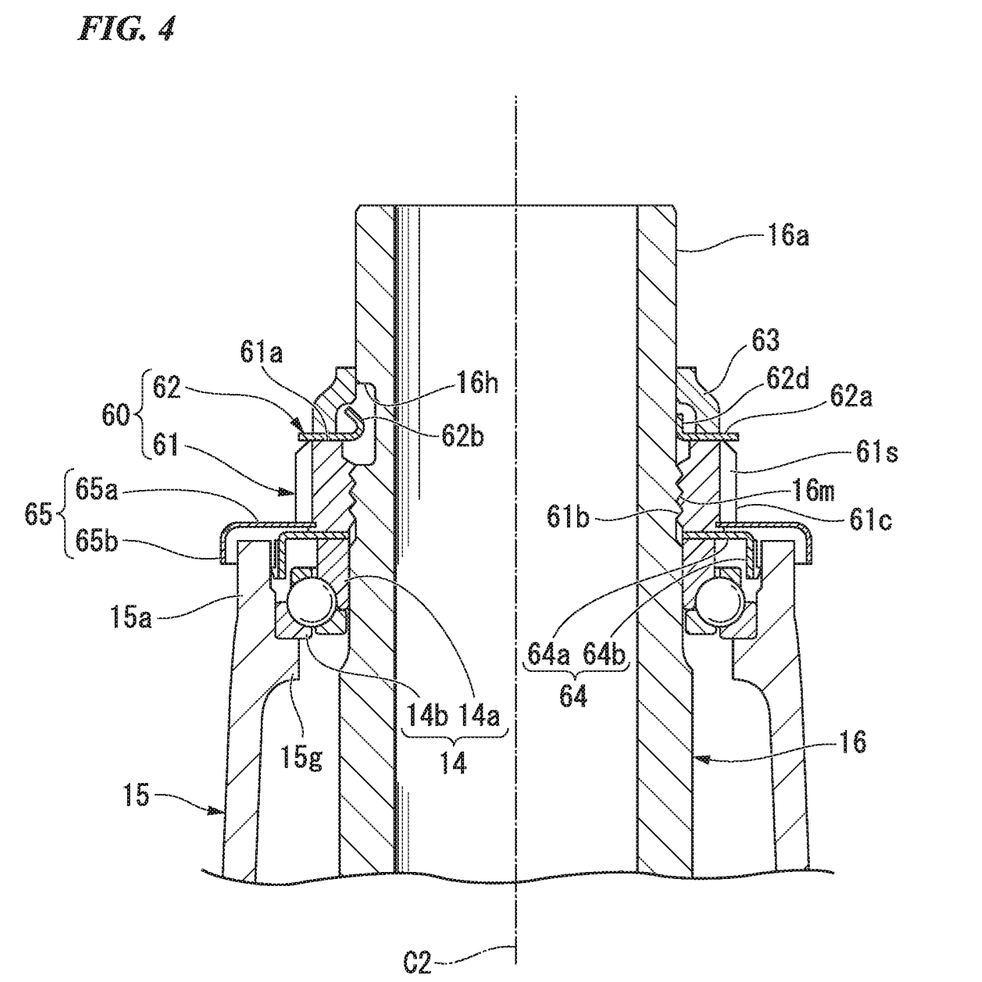
FIG. 4 is a cross-sectional view taken along line IV-IV in FIG. 2.

Referring to both FIGS. 3 and 4, in a state in which the upper end portion 16a of the shaft section 16 protrudes from the fork holder 15 to the outside, a bearing 14 configured to rotatably support the shaft section 16 is assembled between the shaft section 16 and the fork holder 15 from an opening side at which the fork holder 15 opens (the upper end portion 16a side of the shaft section 16). Specifically, the bearing 14 rotatably supports the shaft section 16 in a state in which the upper end portion 16a of the shaft section 16 protrudes upward from the upper end of the fork holder 15.

<Bearing>

The bearing 14 includes an inner wheel 14a and an outer wheel 14b. For example, the bearing 14 uses a 4-point contact ball bearing in which balls come into contact with the inner wheel 14a and the outer wheel 14b at four points when the inner wheel 14a and the outer wheel 14b are pressed in a radial direction (a direction perpendicular to an axial direction of the shaft section 16). The axial direction of the shaft section 16 is the direction along the second steered axis C2.

The inner wheel 14a is inserted into the shaft section 16. An upper end portion of the inner wheel 14a abuts a lower end portion of a thread engagement member 61 (specifically, a cylindrical section 61a) via a seal member 64 (specifically, an annular seal section 64a), which will be described below. Accordingly, a position of the inner wheel 14a in the axial direction of the shaft section 16 is restricted.

The outer wheel 14b is press-fitted into an inner circumferential wall of the upper end portion 15a of the fork holder 15. An annular convex section 15g protruding inward in the radial direction is formed in the upper end portion 15a of the fork holder 15. A lower end portion of the outer wheel 14b abuts an upper end portion of the annular convex section 15g. Accordingly, a position of the outer wheel 14b in the axial direction of the shaft section 16 is restricted.

<Seal Member>

The seal member 64 configured to cover the bearing 14 from an opening side of the fork holder 15 is installed between the shaft section 16 and the fork holder 15. The seal member 64 includes the annular seal section 64a formed in an annular shape coaxially with the shaft section 16, and an engaging seal section 64b protruding from an outer circumferential edge of the annular seal section 64a to face an inner circumferential wall of the upper end portion 15a of the fork holder 15 in the axial direction of the shaft section 16, and configured to be engaged with the inner circumferential wall.

<Retaining Mechanism (Thread Engagement Member and Locking Member)>

A retaining mechanism 60 configured to perform retaining of the bearing 14 is attached to the upper end portion 16a of the shaft section 16. The retaining mechanism 60 includes the thread engagement member 61 threadedly coaxially fastened to the shaft section 16 from the opening side of the fork holder 15, and a locking member 62 configured to be partially locked to the shaft section 16 and the thread engagement member 61.

A concave section 16h recessed inward from an outer circumferential surface of the shaft section 16 in the radial direction is partially formed in the upper end portion 16a of the shaft section 16 in a circumferential direction. Since the shaft section 16 is formed of aluminum as described above, even when the concave section 16h is formed in the upper end portion 16a of the shaft section 16, a thickness of a portion in which the concave section is formed can be sufficiently increased to secure rigidity.

Only one concave section 16h is formed in the circumferential direction of the shaft section 16. When seen in the cross-sectional view of FIG. 3, the concave section 16h (a broken line section) has an elongated hole shape extending in the axial direction of the shaft section 16.

A male thread section 16m is formed on an outer circumference of the upper end portion 16a of the shaft section 16. The male thread section 16m is partially formed on a portion of the upper end portion 16a of the shaft section 16 close to the upper end portion 15a of the fork holder 15. In other words, when seen in a cross-sectional view of FIG. 3, the male thread section 16m is formed in a portion of the upper end portion 16a of the shaft section 16 between the concave section 16h and the upper end of the fork holder 15.

Figure 2:
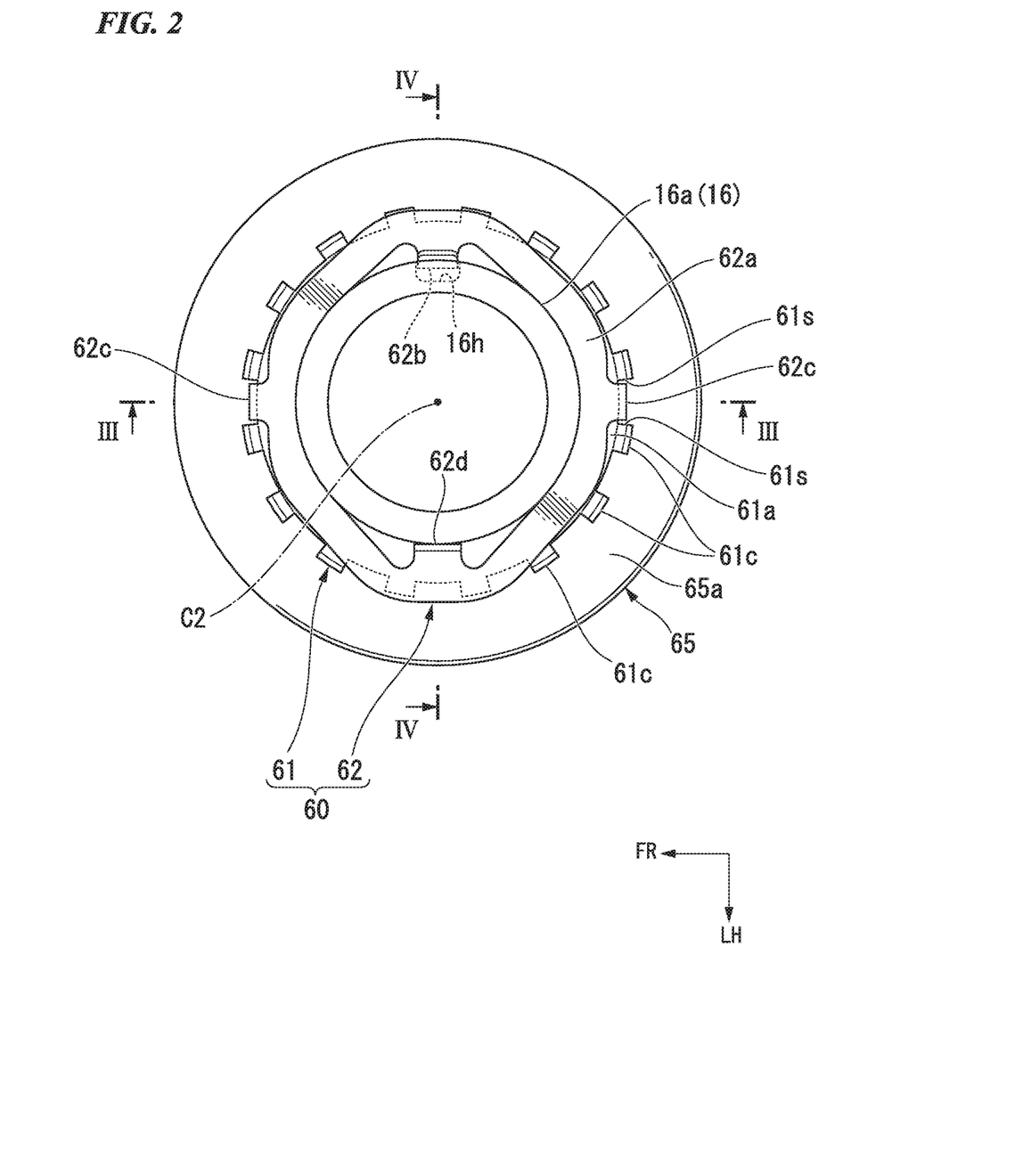
FIG. 2 is a view showing a retaining mechanism of a bearing according to the embodiment from a direction along a second steered axis.

Referring to both FIGS. 2 and 3, the thread engagement member 61 includes the cylindrical section 61a formed in a cylindrical shape coaxially with the shaft section 16, and a plurality of (for example, 16 in the embodiment) protrusions 61c protruding from the outer circumferential surface of the cylindrical section 61a outside in the radial direction. A female thread section 61b threadedly engaged with the male thread section 16m is formed inside the cylindrical section 61a in the radial direction. Flat surface sections 61s crossing (for example, in the embodiment, substantially perpendicular to) the circumferential direction of the shaft section 16 are formed on both side surfaces of the protrusions 61c in the circumferential direction.

A convex fitting section 62b (a convex section) fitted into the concave section 16h and an engaging section 62c engaged with the flat surface section 61s are formed on the locking member 62. Specifically, the locking member 62 includes an annular section 62a formed in an annular shape coaxially with the shaft section 16, the convex fitting section 62b protruding inward from an inner circumferential edge of the annular section 62a in the radial direction and fitted into the concave section 16h, a convex abutting section 62d protruding inward from an inner circumferential edge of the annular section 62a in the radial direction and abutting the outer circumferential surface of the shaft section 16, and the engaging section 62c protruding from the outer circumferential edge of the annular section 62a to face the outer circumferential surface of the cylindrical section 61a in the axial direction of the shaft section 16, and configured to be engaged with the flat surface section 61s.

One convex fitting section 62b and one convex abutting section 62d are formed in the circumferential direction of the shaft section 16. When seen in the direction along the second steered axis C2 of FIG. 2, the convex fitting section 62b and the convex abutting section 62d face each other with the shaft section 16 sandwiched therebetween. Accordingly, when seen in the direction along the second steered axis C2 of FIG. 2, the convex fitting section 62b can be easily fitted into the concave section 16h in comparison with the case in which the convex fitting section 62b and the convex abutting section 62d do not face each other with the shaft section 16 sandwiched therebetween.

Two engaging sections 62c are formed in the circumferential direction of the shaft section 16. When seen in the direction along the second steered axis C2 of FIG. 2, the two engaging sections 62c are rotationally symmetrically disposed. In other words, when seen in the direction along the second steered axis C2 of FIG. 2, the two engaging sections 62c are disposed at intermediate positions between the convex fitting section 62b and the convex abutting section 62d in the circumferential direction of the shaft section 16.

The convex fitting section 62b, the convex abutting section 62d and the engaging section 62c are constituted by one continuous member. Specifically, the convex fitting section 62b, the convex abutting section 62d, and the engaging section 62c are formed by folding the same plate member. For example, a plurality of plate members are formed from a plate-shaped mother material by punching the mother material via pressing or the like, and the convex fitting section 62b, the convex abutting section 62d, and the engaging section 62c are formed by folding parts of the plate members.

When seen in the direction along the second steered axis C2 of FIG. 2, the plurality of protrusions 61c are arranged in the circumferential direction of the shaft section 16 using the shaft section 16 as a symmetrical axis. In other words, the plurality of flat surface sections 61s are arranged in the circumferential direction of the shaft section 16 using the shaft section 16 as a symmetrical axis. When seen in the direction along the second steered axis C2 of FIG. 2, the plurality of flat surface sections 61s are disposed rotationally symmetrically. Pitches of the protrusions 61c (intervals between two flat surface sections 61s neighboring in the circumferential direction of the shaft section 16) have substantially the same magnitude.

When seen in the direction along the second steered axis C2 of FIG. 2, the engaging section 62c is disposed between two flat surface sections 61s neighboring in the circumferential direction of the shaft section 16. When seen in the direction along the second steered axis C2 of FIG. 2, a width of the engaging section 62c (specifically, a length of the engaging section 62c in the circumferential direction of the shaft section 16) is slightly smaller than a pitch of the protrusions 61c.

<Dust Cover>

Referring together to FIGS. 3 and 4, a dust cover 63 configured to suppress adhesion of dusts to the upper end portion 16a of the shaft section 16 is installed above the locking member 62. The dust cover 63 is formed in a cylindrical shape coaxial with the shaft section 16 and having a diameter that is reduced as it goes upward. An inner circumferential surface of the upper end portion of the dust cover 63 abuts an outer circumferential surface of the upper end portion 16a of the shaft section 16. A lower end portion of the dust cover 63 abuts the annular section 62a of the locking member 62. The steered member 45 that constitutes the steering mechanism 40 is fixed to the upper end portion 16a of the shaft section 16 above the dust cover 63.

When seen in a cross-sectional view of FIG. 3, through-holes 45h opening in the vehicle width direction are formed in front and rear intermediate sections of the shaft support section 45b of the steered member 45. When seen in the cross-sectional view of FIG. 3, notches 16i (a fixing unit) opening in the vehicle width direction to face the through-holes 45h are formed in the upper end portion 16a of the shaft section 16. For example, when the steered member 45 is fastened and fixed to the upper end portion 16a of the shaft section 16, as a pin is inserted into the through-holes 45h and the notches 16i, rotation of the steered member 45 in the circumferential direction of the shaft section 16 can be restricted.

<Cover Member>

Referring together to FIGS. 2 and 3, a cover member 65 configured to suppress intrusion of foreign substances (for example, mud, rainwater, and so on) between the shaft section 16 and the fork holder 15 is installed above the seal member 64. The cover member 65 includes an annular eave section 65a formed in an annular shape coaxial with the shaft section 16, and an annular wall section 65b protruding from an outer circumferential edge of the annular eave section 65a to face an outer circumferential wall of the upper end portion 15a of the fork holder 15 in the axial direction of the shaft section 16.

<Lid Member>

Referring to FIG. 3, a lid member 66 configured to suppress intrusion of foreign substances (for example, mud, rainwater, and so on) into the shaft section 16 is installed on the upper end portion 16a of the shaft section 16. The lid member 66 includes a top plate section 66a formed in a disk shape coaxial with the shaft section 16, an abutting wall section 66b protruding from an outer circumferential edge of the top plate section 66a to abut an upper end of the shaft section 16 in the axial direction of the shaft section 16, and an engaging piece 66c protruding from a portion of a lower surface of the top plate section 66a close to the abutting wall section 66b to face an inner circumferential wall of the upper end portion 16a of the shaft section 16 in the axial direction of the shaft section 16 and configured to engage with the inner circumferential wall. In FIGS. 2 and 4, illustration of the lid member 66 or the like will be omitted.

<Assembly Method of Retaining Mechanism>

An assembly method of a retaining mechanism according to the embodiment includes a bearing assembly process of assembling the bearing 14 between the shaft section 16 and the fork holder 15, a seal member assembly process configured to assemble the seal member 64 after the bearing assembly process, and a retaining mechanism assembly process configured to assemble the retaining mechanism after the seal member assembly process. The retaining mechanism assembly process includes a thread engagement member assembly process and a locking member assembly process.

Referring to FIG. 3, in the bearing assembly process, in a state in which the upper end portion 16a of the shaft section 16 protrudes upward from the upper end of the fork holder 15, the bearing 14 is assembled between the shaft section 16 and the fork holder 15 from the opening side of the fork holder 15. For example, in the bearing assembly process, the inner wheel 14a of the bearing 14 is inserted into the shaft section 16, and the outer wheel 14b is press-fitted into the inner circumferential wall of the upper end portion 15a of the fork holder 15. As the lower end portion of the outer wheel 14b abuts the upper end portion of the annular convex section 15g, a position of the outer wheel 14b in the axial direction of the shaft section 16 is restricted.

After the bearing assembly process, the seal member 64 configured to cover the bearing 14 from the opening side of the fork holder 15 is assembled between the shaft section 16 and the fork holder 15 (the seal member assembly process). Specifically, in the seal member assembly process, the annular seal section 64a of the seal member 64 is disposed above the inner wheel 14a, and the engaging seal section 64b is engaged with the inner circumferential wall of the upper end portion 15a of the fork holder 15.

After the seal member assembly process, the retaining mechanism 60 configured to perform retaining of the bearing 14 is assembled to the upper end portion 16a of the shaft section 16 (the retaining mechanism assembly process). Specifically, in the retaining mechanism assembly process, first, the thread engagement member 61 is coaxially threadedly fastened to the shaft section 16 from the opening side of the fork holder 15 (the thread engagement member assembly process). Specifically, in the thread engagement member assembly process, the male thread section 16m is threadedly engaged with the female thread section 61b until the lower end portion of the cylindrical section 61a presses the upper end portion of the inner wheel 14a via the annular seal section 64a. As the upper end portion of the inner wheel 14a abuts the lower end portion of the cylindrical section 61a via the annular seal section 64a, a position of the inner wheel 14a in the axial direction of the shaft section 16 is restricted.

After the thread engagement member assembly process, the locking member 62 is assembled to the shaft section 16 and the thread engagement member 61 from the opening side of the fork holder 15 (the locking member assembly process). Specifically, in the locking member assembly process, the convex fitting section 62b is fitted into the concave section 16h, and the engaging section 62c is engaged with the flat surface section 61s. In other words, when seen in the direction along the second steered axis C2 of FIG. 2, the engaging section 62c is disposed between the two flat surface sections 61s neighboring in the circumferential direction of the shaft section 16. Accordingly, rotation of the thread engagement member 61 in the circumferential direction of the shaft section 16 is restricted.

According to the above-mentioned process, assembly of the bearing 14 to the retaining mechanism 60 is terminated.

According to the embodiment, as the female thread section 61b threadedly engaged with the male thread section 16m is formed in the thread engagement member 61, retaining of the bearing 14 from the opening side of the fork holder 15 can be performed by threadedly fastening the thread engagement member 61 to the shaft section 16 coaxially from the opening side of the fork holder 15. As the convex fitting section 62b fitted into the concave section 16h and the engaging section 62c engaged with the flat surface section 61s are formed on the locking member 62, rotation of the thread engagement member 61 in the circumferential direction of the shaft section 16 can be restricted by partially locking the locking member 62 to the shaft section 16 and the thread engagement member 61 from the opening side of the fork holder 15. For example, in a configuration in which the double nut is coaxially threadedly fastened to the shaft section 16 from the opening side of the fork holder 15, since the two lock nuts should be threadedly fastened to the shaft section 16 to perform the retaining of the bearing 14, the assembly work of each lock nut takes time, and assembly workability when the retaining of the bearing 14 is performed may be decreased. On the other hand, in the embodiment, since the thread engagement member 61 and the locking member 62 are used when the retaining of the bearing 14 is performed, in performing the retaining of the bearing 14, there is no need to threadedly fasten the two lock nuts to the shaft section 16. That is, in performing the retaining of the bearing 14, only one thread engagement member 61 is threadedly fastened to the shaft section 16, and after the thread engagement member 61 is threadedly fastened to the shaft section 16, it is sufficient to partially lock the one locking member 62 to the shaft section 16 and the thread engagement member 61. For this reason, in comparison with the configuration in which the double nut is used when the retaining of the bearing 14 is performed, it does not takes time to perform the assembly work of the retaining mechanism 60 of the bearing 14. Accordingly, assembly workability when the retaining of the bearing 14 is performed can be improved.

In comparison with the case in which the convex fitting section 62b and the engaging section 62c are separately provided as different members and the convex fitting section 62b and the engaging section 62c are coupled to the annular section 62a through welding or the like, as the convex fitting section 62b and the engaging section 62c are constituted by one continuous member, manufacturing cost of the locking member 62 can be reduced because there is no need to separately provide molding processes and molds to the members and there is no need to provide a plurality of processes and facilities such as a welding process, a positioning jig, and so on. In comparison with the case in which the convex fitting section 62b and the engaging section 62c are formed of a thick member having a thickness larger than the plate member, a reduction in weight of the locking member 62 can be achieved.

The shaft section 16 is installed on the front forks 17 configured to support an axle of the front wheel 11 of the motorcycle, the fork holder 15 is supported by the front block 3 of the vehicle body frame 1 such that a longitudinal direction thereof is along an upward/downward direction, and the bearing 14 rotatably supports the shaft section 16 in a state in which the upper end portion 16a protrudes upward from the upper end of the fork holder 15. As a result, upon assembly of the vehicle, the bearing 14 can be assembled between the shaft section 16 and the fork holder 15 from the side of the upper end portion 16a of the shaft section 16, and after that, the thread engagement member 61 and the locking member 62 can be assembled from above the upper end portion 16a. Accordingly, upon assembly of the vehicle, assembly workability when the retaining of the bearing 14 is performed can be improved.

As the dust cover 63 is installed above the locking member 62 and the fixing unit (the notch 16i) configured to fix the steering mechanism 40 is installed on the upper end portion 16a of the shaft section 16 above the dust cover 63, since the retaining of the locking member 62 can be performed by the dust cover 63 by fixing the steering mechanism 40 to the upper end portion 16a of the shaft section 16, there is no need to install dedicated parts to perform the retaining of the locking member 62. That is, the dust cover 63 has a function of performing the retaining of the locking member 62, in addition to a function of suppressing adhesion of dusts to the upper end portion 16a of the shaft section 16. Accordingly, a retaining structure of the locking member 62 can be simplified.

As the plurality of flat surface sections 61s are arranged in the circumferential direction of the shaft section 16 using the shaft section 16 as a symmetrical axis and the engaging section 62c is disposed between the two flat surface sections 61s neighboring in the circumferential direction of the shaft section 16, even when a position of the flat surface section 61s in the circumferential direction of the shaft section 16 is somewhat varied by threaded engagement between the male thread section 16m and the female thread section 61b, since a plurality of disposition regions of the engaging sections 62c (between the two flat surface sections 61s neighboring in the circumferential direction of the shaft section 16) are disposed to be arranged in the circumferential direction of the shaft section 16, assembly workability of the locking member 62 can be improved in comparison with the case in which the flat surface sections 61s are disposed only partially in the circumferential direction of the shaft section 16.

When seen in the axial direction of the shaft section 16, as the plurality of flat surface sections 61s are disposed rotationally symmetrically and the two engaging sections 62c are disposed rotationally symmetrically, even when the positions of the flat surface sections 61s in the circumferential direction of the shaft section 16 are somewhat varied by threaded engagement between the male thread section 16m and the female thread section 61b, since the disposition regions of the engaging sections 62c are disposed rotationally symmetrically, assembly workability of the locking member 62 can be improved in comparison with the case in which the plurality of flat surface sections 61s and the two engaging sections 62c are not disposed rotationally symmetrically.

While the bearing structure for a shaft assembled between the shaft section 16 and the fork holder 15 from the opening side of the fork holder 15 in a state in which the shaft section 16, the fork holder 15 and the upper end portion 16a of the shaft section 16 protrudes upward from the upper end of the fork holder 15 and including the bearing 14 configured to rotatably support the shaft section 16 are exemplarily described in the embodiment, the embodiment is not limited thereto. For example, the shaft section 16 may be a shaft that constitutes a part of the vehicle. That is, the bearing structure for a shaft may include a shaft, a cylindrical holder in which the shaft is disposed, and a bearing assembled between the shaft and the holder at the opening side of the holder and configured to rotatably support the shaft.

While the example in which the inner wheel 14a is inserted into the shaft section 16 and the outer wheel 14b is press-fitted into the inner circumferential wall of the upper end portion 15a of the fork holder 15 has been exemplarily described in the embodiment, the embodiment is not limited thereto. For example, the inner wheel 14a may be press-fitted into the shaft section 16 and the outer wheel 14b may be inserted into the inner circumferential wall of the upper end portion 15a of the fork holder 15.

While the example in which only one concave section 16h is formed in the circumferential direction of the shaft section 16 has been exemplarily described in the embodiment, the embodiment is not limited thereto. For example, the plurality of concave sections 16h may be formed in the circumferential direction of the shaft section 16.

While the example in which the concave section 16h (a broken line section) has an elongated hole shape extending in the axial direction of the shaft section 16 when seen in a cross-sectional view of FIG. 3 has been exemplarily described in the embodiment, the embodiment is not limited thereto. For example, when seen in the cross-sectional view of FIG. 3, the concave section 16h may have a circular, elliptical and rectangular shape, and so on. That is, the concave section 16h may have a shape into which the convex fitting section 62b can be fitted.

While the example in which only one convex fitting section 62b is formed in the circumferential direction of the shaft section 16 has been exemplarily described in the embodiment, the embodiment is not limited thereto. For example, the plurality of convex fitting sections 62b may be formed in the circumferential direction of the shaft section 16. The plurality of convex fitting sections 62b may be rotationally symmetrically disposed when seen in the axial direction of the shaft section 16. The plurality of concave sections 16h may also be disposed rotationally symmetrically when seen in the axial direction of the shaft section 16 according to disposition of the convex fitting section 62b. Accordingly, a torque can be received by the locking member 62 with good balance.

While the example in which the convex fitting section 62b and the engaging section 62c are formed by folding the same plate member has been exemplarily described in the embodiment, the embodiment is not limited thereto. For example, the convex fitting section 62b and the engaging section 62c may be separately provided by different members, or the convex fitting section 62b and the engaging section 62c may be coupled to the annular section 62a through welding or the like.

While the example in which the convex fitting section 62b, the convex abutting section 62d and the engaging section 62c are formed by punching the plate-shaped mother material through pressing or the like to form the plurality of plate members from the mother material and folding parts of the plates members has been exemplarily described in the embodiment, the embodiment is not limited thereto. For example, the convex fitting section 62b, the convex abutting section 62d and the engaging section 62c may be formed by cutting the plate-shaped mother material using a cutter or the like to form the plurality of plate members from the mother material, and folding parts of the plate members.

While the example in which the dust cover 63 is installed above the locking member 62 and the steering mechanism 40 is fixed to the upper end portion 16a of the shaft section 16 above the dust cover 63 has been exemplarily described in the embodiment, the embodiment is not limited thereto. For example, the dust cover 63 may be not installed above the locking member 62, and a dedicated part for performing retaining of the locking member 62 may be installed above the locking member 62.

While the example in which the plurality of flat surface sections 61s are disposed to be arranged in the circumferential direction of the shaft section 16 using the shaft section 16 as a symmetrical axis and the engaging section 62c is disposed between the two flat surface sections 61s neighboring in the circumferential direction of the shaft section 16 has been exemplarily described in the embodiment, the embodiment is not limited thereto. For example, the flat surface section 61s may be disposed on only a part of the shaft section 16 in the circumferential direction.

The present invention is not limited to the above-mentioned embodiment, for example, the entire bearing structure for a shaft in a motorcycle is included in the bearing structure for a shaft, and in addition to the configuration having the front wheel suspension system such as the link mechanism or the like, application to a configuration with no front wheel suspension system is also provided.

The saddle riding vehicle includes all vehicles on which a driver rides to straddle a vehicle body, is not limited to a motorcycle (including a prime-mover-attached bicycle and a scooter type vehicle) and also includes a three-wheeled vehicle (including vehicles with two front wheels and one rear wheel in addition to one front wheel and two rear wheels) or a four-wheeled vehicle.

Moreover, the configuration in the above embodiment is an example of the present invention, and various modifications are possible without departing from the gist of the present invention, such as replacing the constituent elements of the embodiment with well-known constituent elements.

BRIEF DESCRIPTION OF THE REFERENCE SYMBOLS

1: vehicle body frame
14: bearing
15: fork holder (holder)
16: shaft section (shaft)
16a: upper end portion (first end portion)
16h: concave section
16m: male thread section
17: front forks (fork)
40: steering mechanism
61: thread engagement member
61b: female thread section
61c: flat surface section
62: locking member
62b: convex fitting section (convex section)
62c: engaging section
63: dust cover

What is claim is:
1. A vehicle body front section of a motorcycle comprising:
a shaft on which a male thread section is formed and a concave section recessed inside in a radial direction is partially formed in a circumferential direction thereof;
a cylindrical holder in which the shaft is disposed;
a bearing attached between the shaft and the holder and configured to rotatably support the shaft at an opening side thereof at which the holder is open;
a thread engagement member having a female thread section threadedly engaged with the male thread section and a plurality of flat surface sections crossing the circumferential direction of the shaft and formed on an outer circumference thereof, and coaxially threadedly fastened to the shaft from the opening side; and
a locking member having a convex section fitted into the concave section and an engaging section engaged with the plurality of flat surface sections, and partially locked to the shaft and the thread engagement member,
wherein the shaft is disposed over front forks while supporting an axle of a front wheel of a saddle riding vehicle, the concave section is formed in a side surface of the shaft in a vehicle width direction, the plurality of flat surface sections are disposed to be arranged in the circumferential direction of the shaft using the shaft as a symmetrical axis, the engaging section is disposed between two of the plurality of flat surface sections neighboring in the circumferential direction of the shaft, a retaining member for performing a retaining of the locking member above the locking member is provided, the retaining member is formed in a cylindrical shape coaxial with the shaft and having a diameter that is reduced as it goes upward, an inner circumferential surface of an upper end portion of the retaining member abuts an outer circumferential surface of a first end portion of the shaft, a lower end portion of the retaining member abuts an annular section of the locking member, and the retaining member is a dust cover for suppressing adhesion of dust to the first end portion of the shaft, in an axial direction.

2. The vehicle body front section of the motorcycle according to claim 1, wherein the convex section and the engaging section are constituted by a continuous member.

3. The vehicle body front section of the motorcycle according to claim 1, wherein the holder is supported by a vehicle body frame such that a longitudinal direction is along an upward/downward direction, and
the bearing rotatably supports the shaft in a state in which the first end portion of the shaft in the axial direction protrudes upward from an upper end of the holder.

4. The vehicle body front section of the motorcycle according to claim 3, wherein
a fixing unit configured to fix a steering mechanism is installed on the first end portion above the dust cover.

5. The vehicle body front section of the motorcycle according to claim 1, wherein, when seen in the axial direction of the shaft, the plurality of flat surface sections are disposed rotationally symmetrically, and either at least one of the convex section or the engaging section are disposed rotationally symmetrically.

* * * * *